US012731488B2

(12) United States Patent
Thyagaturu et al.

(10) Patent No.: US 12,731,488 B2
(45) Date of Patent: Sep. 8, 2026

(54) VEHICLE MANAGEMENT WITH A VEHICLE DATA CENTER

(71) Applicant: Intel Corporation, Santa Clara, CA (US)

(72) Inventors: Akhilesh S. Thyagaturu, Ruskin, FL (US); Hassnaa Moustafa, San Jose, CA (US); Francesc Guim Bernat, Barcelona (ES); Karthik Kumar, Chandler, AZ (US); Shabbir Ahmed, Beaverton, OR (US); Vuk Lesi, Cornelius, OR (US); Jonathan Kyle, Atlanta, GA (US)

(73) Assignee: Intel Corporation, Santa Clara, CA (US)

( * ) Notice: Subject to any disclaimer, the term of this patent is extended or adjusted under 35 U.S.C. 154(b) by 217 days.

(21) Appl. No.: 18/618,437

(22) Filed: Mar. 27, 2024

(65) Prior Publication Data

US 2025/0308386 A1 Oct. 2, 2025

(51) Int. Cl.
*G08G 1/14* (2006.01)
*B60W 30/06* (2006.01)
*B60W 50/14* (2020.01)

(52) U.S. Cl.
CPC ............. *G08G 1/148* (2013.01); *B60W 30/06* (2013.01); *B60W 50/14* (2013.01); *G08G 1/143* (2013.01)

(58) Field of Classification Search
CPC ........ G08G 1/148; G08G 1/143; G08G 1/146; G08G 1/096725; B60W 30/06; B60W 50/14; G06Q 10/02; G06Q 2220/00; G06Q 2240/00; G06Q 10/0631; G06Q 50/40; B62D 15/0285
USPC ...................... 340/932.2, 933, 988, 990, 993
See application file for complete search history.

(56) References Cited

U.S. PATENT DOCUMENTS

| | | | | |
|---|---|---|---|---|
| 11,403,517 | B2 | 8/2022 | Tickoo et al. | |
| 11,881,108 | B2 * | 1/2024 | Barrett | G08G 1/015 |
| 2014/0320318 | A1 * | 10/2014 | Victor | G08G 1/146 340/932.2 |
| 2019/0141495 | A1 | 5/2019 | Jha et al. | |
| 2019/0283736 | A1 * | 9/2019 | Watanabe | B60W 30/06 |
| 2020/0301743 | A1 | 9/2020 | Moustafa et al. | |
| 2023/0025490 | A1 * | 1/2023 | Koiji | B60W 30/06 |
| 2023/0136951 | A1 * | 5/2023 | Wada | B60W 30/06 340/932.2 |
| 2023/0230135 | A1 * | 7/2023 | Yamaura | G08G 1/14 701/24 |
| 2025/0045108 | A1 * | 2/2025 | Chen | G06F 9/5027 |

* cited by examiner

*Primary Examiner* — Anh V La
(74) *Attorney, Agent, or Firm* — Banner & Witcoff, Ltd.

(57) ABSTRACT

System and techniques to manage vehicles as part of a vehicle data center are described herein. Vehicle management may include the acquisition of a virtual instance definition for the vehicle data center, which outlines the parking spaces that make up the virtual instance and required hardware specifications. Upon detection of an incoming or present vehicle at the parking facility, the vehicle computing capabilities are evaluated. If these capabilities align with those by the virtual instance definition, the vehicle may be assigned to that virtual instance. If assigned, the vehicle is instructed to occupy a designated parking spot, as per the virtual instance definition, where the vehicle will contribute on-board hardware to perform tasks that are either currently running or scheduled to run on the vehicle data center virtual instance.

20 Claims, 9 Drawing Sheets

VEHICLE MANAGEMENT WITH A VEHICLE DATA CENTER

BACKGROUND

Vehicle compute hardware has grown due, in part, to advancements in driver assistance and self-driving technologies. Modern vehicles are often equipped with sophisticated hardware systems that form the backbone of advanced driver assistance systems (ADAS) and autonomous driving capabilities. This hardware typically includes high-performance central processing units (CPUs) and graphics processing units (GPUs) to manage the enormous data processing involved with ADAS and autonomous driving. In some examples, neural network processors or Field-Programmable Gate Arrays (FPGAs) are also used to implement machine learning techniques, such as interpreting sensor data from cameras, LiDAR, radar, and ultrasonic sensors. This sensor fusion often uses high-bandwidth memory or fast data pipelines to ensure real-time processing and decision-making capabilities. As a result, vehicle compute hardware has evolved into highly integrated, power-efficient systems capable of supporting complex algorithms and ensuring safety, efficiency, and reliability in driver-assist and self-driving applications.

A vehicular data center (VDC) is a data center in which some of the compute capabilities (e.g., software or hardware) reside in one or more vehicles. Thus, a vehicle equipped with computing capabilities acts as a node in a larger, data center network that can be managed among the nodes or by an edge or cloud orchestrator.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
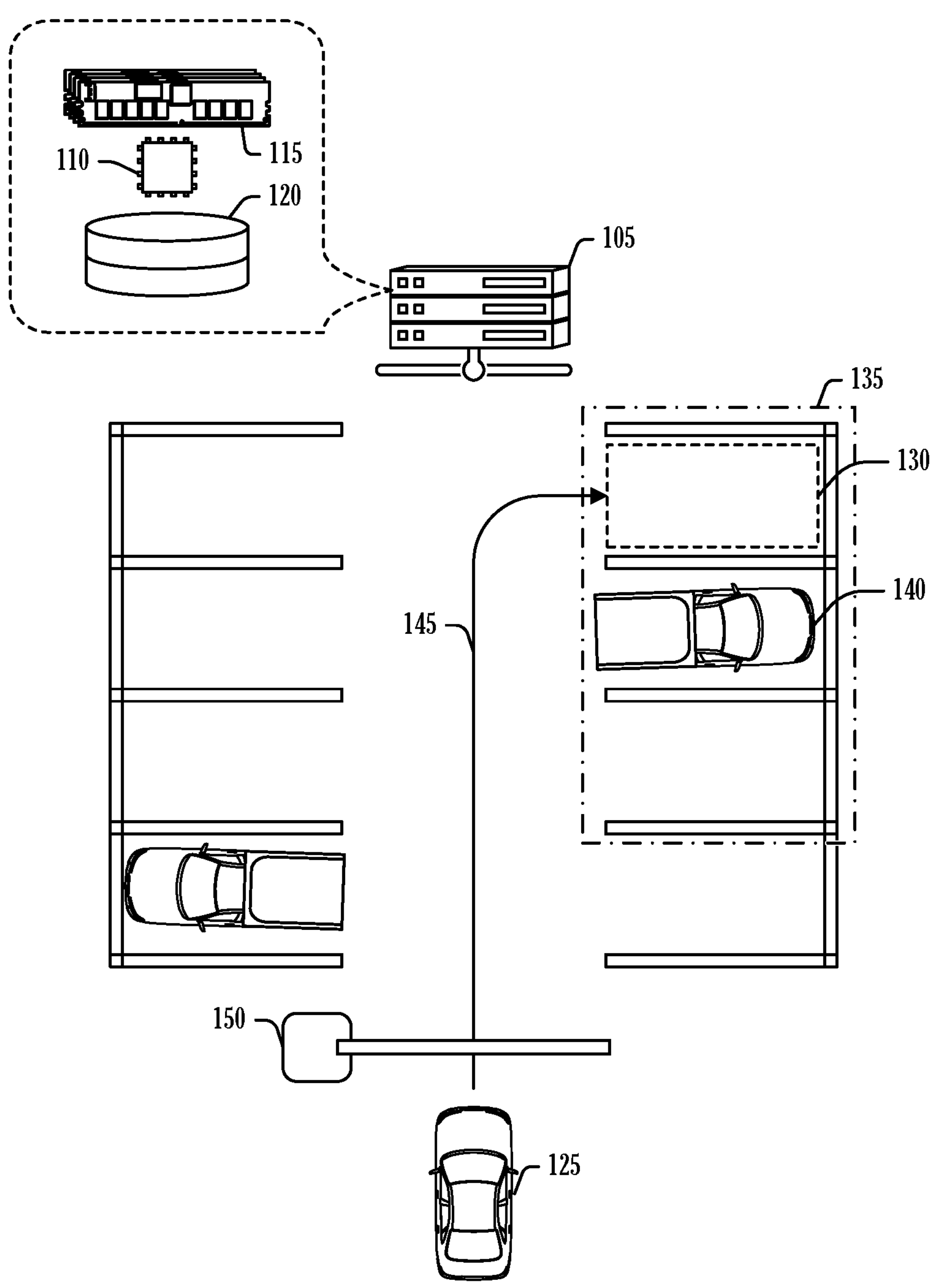
FIG. 1 is a block diagram of an example of an environment including a system for vehicle management in vehicle data center, according to an embodiment.

A use has been pursued for the latent computing power in a variety of mobile devices. The level of resources present in computer assisted or autonomous driving facilities present greater opportunities than those in typical mobile phones, for example. Because vehicles are often not in use, such as while a person is at work, at a shopping center, etc., there is little cause to prevent the use of computing resources at these times. Parked cars represent massive compute resources with vehicles platforms that may accommodate several software features or applications. Generally, parked cars are where people are. Vehicular infrastructure follows users to shopping malls, airports, stadiums, universities, and enterprise locations among others. Thus, there is great potential in a network of parked vehicles, their unused computing resources pooled together to create a distributed data center with powerful processors and storage capabilities. When idle, these vehicles may share processing power or storage space to handle computational tasks.

Attempts to implement such a data center have run into some issues. Generally, these networks have been treated as previous attempts to recruit the computing resources of mobile devices. The techniques observe what is available, attempt to initiate an activity (e.g., a computation), and maintain redundancy if the vehicle leaves such that the task may be completed with another vehicle. In short, rapid changes of the infrastructure (e.g., vehicles) are poorly handled, application decomposition is not based on the actual vehicles available, vehicle arrival and departure information in not considered.

To address these issues, a technique for vehicle management in a vehicle data center is described herein. The underlying element of the available vehicle is addressed to co-locate vehicles with computing capabilities that enable a compute node provided by a vehicle to handle certain tasks. Thus, as a vehicle approaches a parking area or facility (e.g., a charging station), the capabilities of the vehicle are matched to a set of physical locations (e.g., parking spots) that form part of a vehicle data center virtual instance. The vehicle is then directed to park in one of these spots to support the hardware definition of the vehicle data center virtual instance. In an example, while moving to the assigned parking spot, a workload, workload definition, or a configuration may be transmitted to the vehicle so as to reduce latency in joining the vehicle to the vehicle data center virtual instance. In an example, workload decomposition is based on the vehicle data center virtual instance definition such that the specific vehicle capabilities do not matter except to indicate compatibility with the vehicle data center virtual instance definition. However, in an example, workload decomposition may be carried out based on the specific vehicle capabilities. This example may result in greater compute resources being spent by the supporting infrastructure (e.g., a parking facility edge computing node) to bring greater efficiency of execution on the vehicle computing system.

Other example components that may be employed include task decomposition based on the vehicle arrival information. In an example, look-ahead information may be used to detect incoming compute capable vehicles, identify vehicle type, or assess the on-board compute capabilities such as CPU, GPU, storage, input-output accelerators, or network capabilities (e.g., cellular or satellite network bandwidth). In an example, task decomposition is based on composable applications in a microservice architecture. In an example, arrival tracking is based on cloud tracking of centralized geo-location of autonomous driving of cars, or vehicle provided information on arrival, and often departure for parking. These details may be used to plan vehicle data center virtual instance time-frames for a more stable operating platform.

The growing prevalence of electric vehicles that use charging infrastructure indicates a benefit in using the charging infrastructure in furtherance of the vehicle data center, for example, edge compute components may be included in chargers. In an example, charging stations—or other parking hubs—may provide services based on end-to-end service-based connections or power-aware features of parked vehicles to facilitate compute-at-scale close to data-center scale. In an example, compute costs may be determined in cycles for charging. For example, consider that vehicles often have variable amounts of charge, and thus variable amounts of time spent charging. A proposed charge request (e.g., a certain amount of time or power at a particular charger or charger type) may be converted into a compute cycle cost, which is translated in terms of compute capabilities of the vehicle. Here, the vehicle owner is incentivized to participate in the vehicle data center to offset charging costs. Thus, a symbiotic relationship between vehicles, and vehicle owners, and charging facilities is created. In other cases, such as with cars that do not need charging, incentives such as priority parking or participation in the data center network may be used.

Leveraging existing parked vehicles as processing power eliminates the need for building new data centers. This may reduce infrastructure or maintenance costs. High-powered vehicles parked closer to data-intensive tasks result in faster data processing and lower latency. This is particularly beneficial for real-time applications like traffic management, augmented reality (AR) or virtual reality (VR), or edge computing. In an example, by matching vehicles with compatible tasks, the system ensures efficient utilization of processing power, storage, and network bandwidth. This reduces idle resources and maximizes overall system performance. Further, by matching vehicles charge requirements with compute costs, the system enables a closed loop mechanism where densely populated urban infrastructures—where such parking structures are typically located—may benefit from large amounts of compute capability, in exchange for charge that may be provided by the grid, or sources like solar on top of the structure.

FIG. 1 is a block diagram of an example of an environment including a system 105 for vehicle management in vehicle data center, according to an embodiment. The system 105 includes processing circuitry 110, storage 120 (e.g., power-stable storage such as a hard drive, solid state drive, etc.), and memory 115. The memory 115 is generally used to maintain running state information for the system 105 that is generally discarded between system power cycles or restarts. The memory 115 and the storage 120 are both forms of computer readable media.

The system 105 is part of a parking facility or infrastructure that includes multiple parking spaces (e.g., such as parking space 130) in which a vehicle may be parked. The system 105 may be part of other components of the parking facility, such as a gate, charging stations, wired networks (e.g., via charging cables), wireless networks, sensors (e.g., parking space occupancy sensors), and signals (e.g., signal lights, indicators, etc.).

The following example of an implementation of vehicle management in a vehicle data center occurs from the perspective of the processing circuitry 110 signaling to other components or itself providing facilities to carry out the vehicle management. However, in an example, these operations may be divided differently between multiple components, such as a cluster of edge nodes of the parking facility, with one or more cloud functions, or other computing arrangements.

The processing circuitry 110 is configured to obtain (e.g., retrieve or receive) a definition for a vehicle data center virtual instance. This definition includes a set of parking spaces 135 for vehicles and a set of computational metrics. Thus, the definition delineates both the physical bounds of a vehicle data center virtual instance are well as the computational bounds of the vehicle data center virtual instance. In an example, the vehicle data center virtual instance is defined over a time period. In this example, the vehicle data center virtual instance is instantiated, or defined to be active, within a time window (e.g., a start time and end-time) to address likely computational scenarios (e.g., clocking in when arriving to work) or likely computational availability (e.g., performing computations during a movie run time at a theater). In an example, a second parking space for the definition belongs to a second definition for a second vehicle data center virtual instance outside of the time period. This example acknowledges that the physical parking space may belong to different a vehicle data center virtual instances at different points in time.

The processing circuitry 110 is configured to sense the arrival of the vehicle 125. In this context, the sensing may be carried out by a sensor installed in the parking facility, by a notification from a navigational aid to the vehicle 125—such as a mapping application providing the arrival time to the system 105—by the gate 150, or by another technique that provides such notification.

The processing circuitry 110 is configured to signal an instruction to park the vehicle 125 in the parking space 130 of the set of parking spaces 135 based on a report of computational capabilities of the vehicle and the set of computational metrics. In an example, the report of computational capabilities are transmitted to the system 105 by the vehicle 125 in response to a prompt from the parking facility (e.g., the gate 150). In an example, the report of computational capabilities is retrieved from the storage 120, or from a cloud source (e.g., a user account for the vehicle 125). In any case, the report of computational capabilities provides a description of hardware or software of the vehicle 125 that may be used in the vehicle data center virtual instance. Thus, if the vehicle data center virtual instance already has a second vehicle 140, the set of computational metrics from the definition of the vehicle data center virtual instance would be partially met by the second vehicle 140. If the report of computational capabilities from the vehicle 125 indicates that more of the set of computational metrics may be met, then the vehicle 125 is instructed to park in the set of parking spaces, or more specifically in the parking space 130 in the set of parking spaces 135.

Positioning between vehicles making up the vehicle data center virtual instance may impact processing times (e.g., latencies between vehicles). Accordingly, spatial relationships between parking spaces in the set of parking spaces 135 may limit data processing abilities of a vehicle data center virtual instance. Accordingly, in an example, the set of parking spaces 135 are contiguous. In an example, the set of parking spaces are within a predefined distance from each other.

In an example, the set of computational metrics include a list of hardware. In an example, the list of hardware includes an accelerator. In an example, the list of hardware includes a set of types of hardware and a count of each type. These examples acknowledge that specific hardware may impact the workloads that the vehicle data center virtual instance is likely to be successful executing. For example, if the workload includes processing a large neural network (NN) model, the use of an NN accelerator is likely necessary. In this case, the type definition may provide a course categorization of the hardware while specific model or output definitions may provide a more refined control of the type of vehicle capable of joining the vehicle data center virtual instance. In an example, the type may include storage and a count of bytes available, a processor architecture and a count of operations, cache, etc., or a network card and a measure of throughput (e.g., bandwidth, latency, etc.).

In an example, to signal the instruction to park the vehicle 125 in the parking space 130, the processing circuitry 110 is configured to provide the instruction to an autonomous driving system of the vehicle 125. Thus, in this example, the vehicle driver need not be concerned with the parking procedure, but rather the vehicle 125 automatically parks in the parking space 130 to join the vehicle data center virtual instance. When an autonomous driving system is absent, the processing circuitry 110 provides the signal in other ways. In an example, the processing circuitry 110 is configured to provide the instruction to the driver of the vehicle 125 to park in the parking space 130. In an example, providing the instruction to the driver includes causing a ticket to be printed at an entry point (e.g., the gate 150). In an example, providing the instruction to the driver includes causing a parking identifier or a map to be communicated to a device (e.g., mobile phone, infotainment system of the vehicle 125, etc.) of the driver. In an example, signaling the instruction to park the vehicle in the one parking space of the set of parking spaces includes providing an instruction to a signaling mechanism of the parking facility to lead a driver of the vehicle or an autonomous driving system of the vehicle to the one parking space. This last example may include light-based signals that the driver may follow, an indicator at the parking space 130, or even audible directions or signals to direct the driver.

The processing circuitry 110 is configured to perform a workload on the vehicle data center virtual instance including use of the computational capabilities of the vehicle 125. Here, the vehicle data center virtual instance is realized (e.g., instantiated) using the vehicle 125 and the second vehicle 140 and processing workloads. Thus, the vehicle data center is realized. Aspects of the workload execution may also be optimized based on vehicle management. In an example, the processing circuitry 110 is configured to transmit (e.g., or cause to be transmitted) a portion of the workload to the vehicle 125 while the vehicle is parking 145 (e.g., transiting to the parking space 130). This may reduce latency in join the vehicle data center virtual instance.

In an example, the processing circuitry 110 is configured to decompose a task to create the workload based on the vehicle data center virtual instance. In an example, decomposing the task to create the workload is based on a predefined start period for the vehicle data center virtual instance. Consider a program that comprises several tasks (e.g., as defined by the programming language or environment of an application). The task may be too large from some vehicles or for the likely hardware of the vehicle data center virtual instance as specified in the definition of the vehicle data center virtual instance. Thus, decomposition (e.g., splitting into smaller pieces) of the task may enable a more predictable or tractable execution of at least a portion of the application. The available computational capabilities may also change over time. Accordingly, different decompositions of the task may be useful at different times to create appropriate workloads for the vehicle data center virtual instance.

In an example, the processing circuitry 110 is configured to obtain a signal that the vehicle 125 will leave the parking space 130. In an example, the signal is based on a sensor, such as a camera detection that a person has entered the vehicle 125. In an example, the signal is based on a communication from the vehicle 125, such as when the vehicle 125 is unlocked or started. In an example, the signal originates with a device or account of the driver (e.g., such as an appointment application). The processing circuitry 110 is configured to migrate a portion of the workload using a computational resource of the vehicle. Thus, the portion of the workload being executed by the vehicle 125 is anticipatorily migrated elsewhere. In an example, migrating the portion of the workload includes transferring the portion of the workload to an edge server of the parking facility. In an example, migrating the portion of the workload includes transferring the portion of the workload to the second vehicle 140 parked in the set of parking spaces 135.

Figure 2:
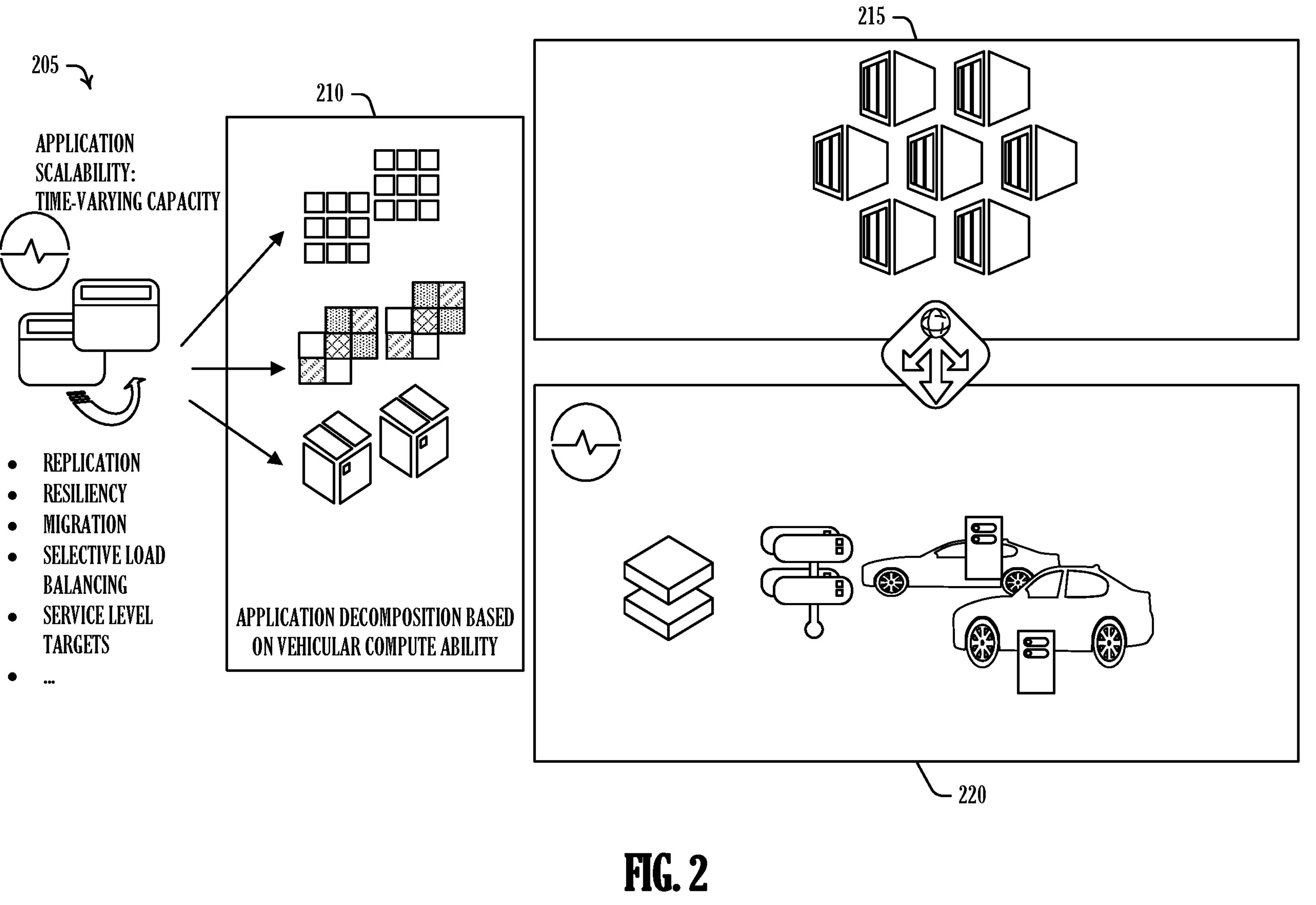
FIG. 2 illustrates an example of using flexible data units for vehicular processing, according to an embodiment.

FIG. 2 illustrates an example of using flexible data units (FDUs) 215 for vehicular processing, according to an embodiment. In an example, the workload balancing 210 may be based on vehicle arrival information. For example, the framework monitors the vehicular data center (VDC) for the addition of hardware through a vehicle join or removal of hardware through a vehicle departure, both of which may trigger a reconfiguration of the hardware pool to match the application 205. In an example, the framework matches the hardware of the vehicular network to the application demands, with the set of requirements being continuously evaluated, and learned by a learning agent, to, for example, add additional random access memory to boost the application processing service level objective (SLO). In an example, Compute Express Link (CXL) pooling of hardware resources, or other similar hardware pooling techniques or standards, may be used for this purpose.

In an example, when the new hardware is less capable of hosting the applications that have been allocated to the VDC, the application 205 may be continuously evaluated to create the FDUs 215 to match the available hardware. For example, if a vehicle departure has pushed resource availability on a virtual cluster 220 below the threshold defined by the application 205 assigned to that virtual cluster 220 such that the application 205 is not able to meet minimum resource requirements for SLO, then the placement of the application 205 may be reevaluated (e.g., recomputing the candidate sets by the workload balancing 210) to ensure that the application 205 may run appropriately on, for example, another virtual cluster. On the other hand, if there is more available processing power (e.g., more or more powerful hardware), then additional applications may be executed by the virtual cluster 220. Accordingly, the virtual cluster 220 may be made available for additional workloads. However, this too may lead to be a global rebalancing. Consider that the virtual cluster 220 is 100% utilized by a single application, the application 205. Adding an additional node to this virtual cluster 220 may lead to the virtual cluster 220 only being 80% utilized. In this case, it may be more efficient to migrate the application 205 off of the virtual cluster 220 and migrate two different loads onto the virtual cluster 220 such that each new load uses 50% of the virtual cluster 220 to approach 100% utilization. The application 205 may be migrated to another virtual cluster that is a better fit.

In an example, the workload balancing 210 may be configured to address a third type of rebalancing that occurs due to cost. For example, different edges may have different costs, for example, due to competitive market effects or resource availability (e.g., electricity costs). Consider, hardware at one co-location facility may become more costly than another. These costs may change over time. Periodic rebalances may be able to achieve the optimal cost for our customer.

In an example, specific secure enclaves specific to vehicles may be used. These enclaves may provide several facilities for secure execution of workloads. In an example, the secure enclaves provide isolated and trusted execution environments (e.g., data isolation) within a vehicle processor. Sensitive data processing may be confined to these enclaves, ensuring that the data remains isolated from the vehicle operating system or any potential malware or vulnerabilities. In an example, the secure enclaves may be used to establish a trusted computing base within the vehicle. This provides a tamper-proof environment for secure boot, code execution, or data storage, ensuring only authorized applications and code can run within the enclave. In an example, secure enclaves may facilitate confidential computing, enabling data analysis or processing within the vehicle without revealing the underlying data itself. This protects user privacy and sensitive information while still enabling valuable insights to be generated.

Figure 3:
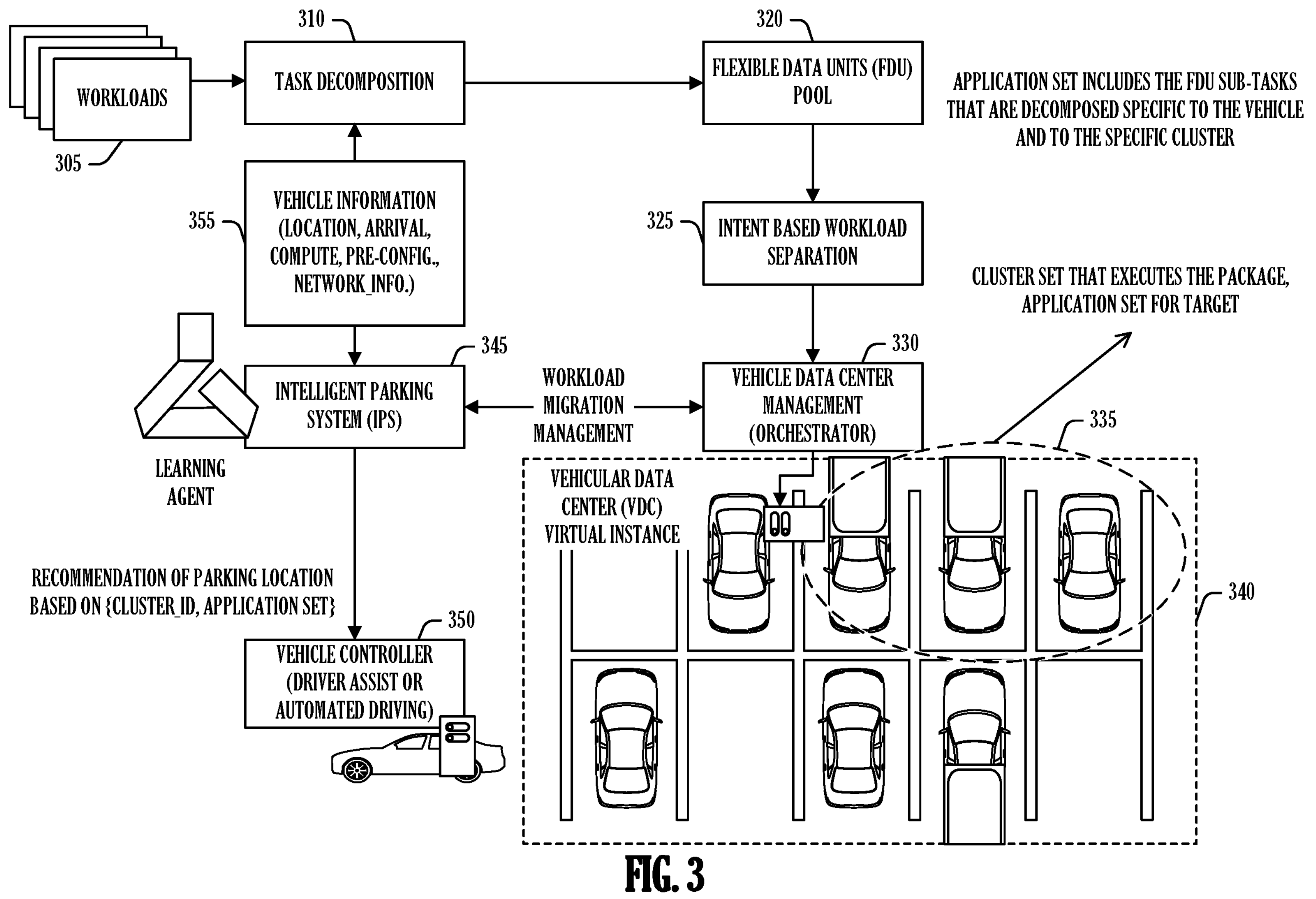
FIG. 3 illustrates an example of flexible data unit decomposition and scheduling, according to an embodiment.

FIG. 3 illustrates an example of FDU decomposition and scheduling, according to an embodiment. Specifically, the illustrated approach employs a learning-based functional decomposition. Workloads 305 are subject to task decomposition 310 based on vehicle information 355. The output is placed in an FDU pool 320 from which FDUs are selected by an intent-based workload processor 325 for delivery to the VDC orchestrator 330. The VDC orchestrator 330 runs the FDU on a virtual cluster 335 in a parking facility 340.

Results of the running FDUs are shared by the VDC orchestrator 330 with a learning agent 345. The learning agent 345 also receives the vehicle information 355 constituting the virtual cluster 335, or other virtual clusters in the parking facility 340. Thus, the learning agent 345 is configured (e.g., trained) to infer needs based on current executions and current hardware. The learning agent 345 may provide the inference result to direct a vehicle controller 350 to add itself, and thus the included hardware, to a specific virtual cluster to improve performance.

Figure 4:
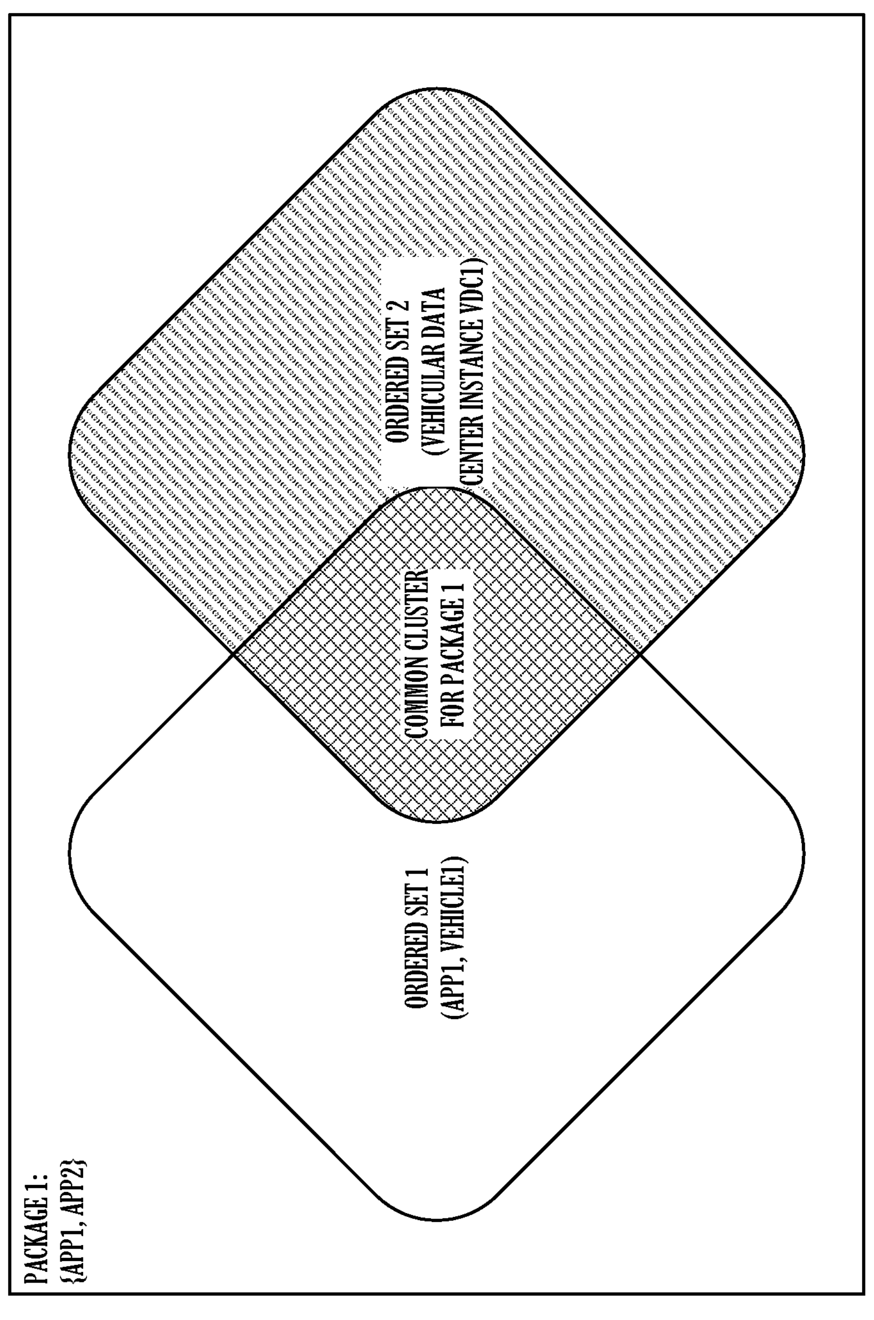
FIG. 4 illustrates an example of common cluster selection, according to an embodiment.

FIG. 4 illustrates an example of common cluster selection, according to an embodiment. Here, the cluster is a representation of a group of vehicles. The cluster maintains a representation of a parked vehicular data center. In general, a cluster is responsible to abstract the vehicles in the parking infrastructure to be a part of the larger vehicular data center. Scalability learning may evaluate the arrival of cars to the parking infrastructure and evaluates the scalability of applications. A learning agent may learn about application requirements and parking arrival of vehicles as part of infrastructure growth. This also accounts for parked vehicle departure, which results in the infrastructure shrinkage. An application specific ordered set prepares applications in a ranking order that may be moved to the vehicles of interest. An ordered set of FDUs may be used for applications. Here, task decomposition decomposes an application into FDUs based on the intent of the applications, and also uses an incoming set of vehicle details to determine to which VDC instance the incoming vehicle should be allocated.

Another type of ordered set is an ordered set of VDC instances. In a given parking infrastructure there may be multiple VDC instances to optimize a certain application or package of multiple applications. Thus, there are multiple (e.g., two) degrees of freedom (e.g., both application orchestration and parking management) for the aggregation of resources. In an example, workload instantiation may be planned ahead of the vehicle arrival, based on the location based tracking, or reserved time of parking of the vehicle. For example, offline images (e.g., applications and data) for the workload instantiation may be taken from an ordered set of FDUs. Thus, once the vehicle is parked, the FDUs may be launched to execute a given task.

Dynamic task assignment may be implemented via techniques that match incoming tasks with available vehicles based on capabilities (e.g., CPU, GPU, storage, network bandwidth, etc.), location (e.g., proximity to data hubs), or current workload to optimize performance and minimize latency. In an example, high-powered vehicles may be prioritized for data-intensive tasks. In an example, incentives, such as like faster charging or exclusive services, may be employed to encourage participation. In an example, machine learning may be used to forecast workload demands or to pre-position vehicles with suitable capabilities in anticipation of peaks. In an example, scheduling may be preempted based on estimated charge level of batteries in an electric vehicle. For example, if charging will be complete withing two hours, a workload that will complete within that time frame will be prioritized over another workload that will likely take linger. In an example, the duration of stay may be estimated based on a target charging value for the vehicle. In an example, a notification is set for the driver to indicate the level of charging before departing. In this scenario, the operator of the vehicle may indicate the target charging level and an estimation of the charging time to achieve the target may be provided to the operator. This information may provide an accurate duration of stay for the vehicle.

Figure 5:
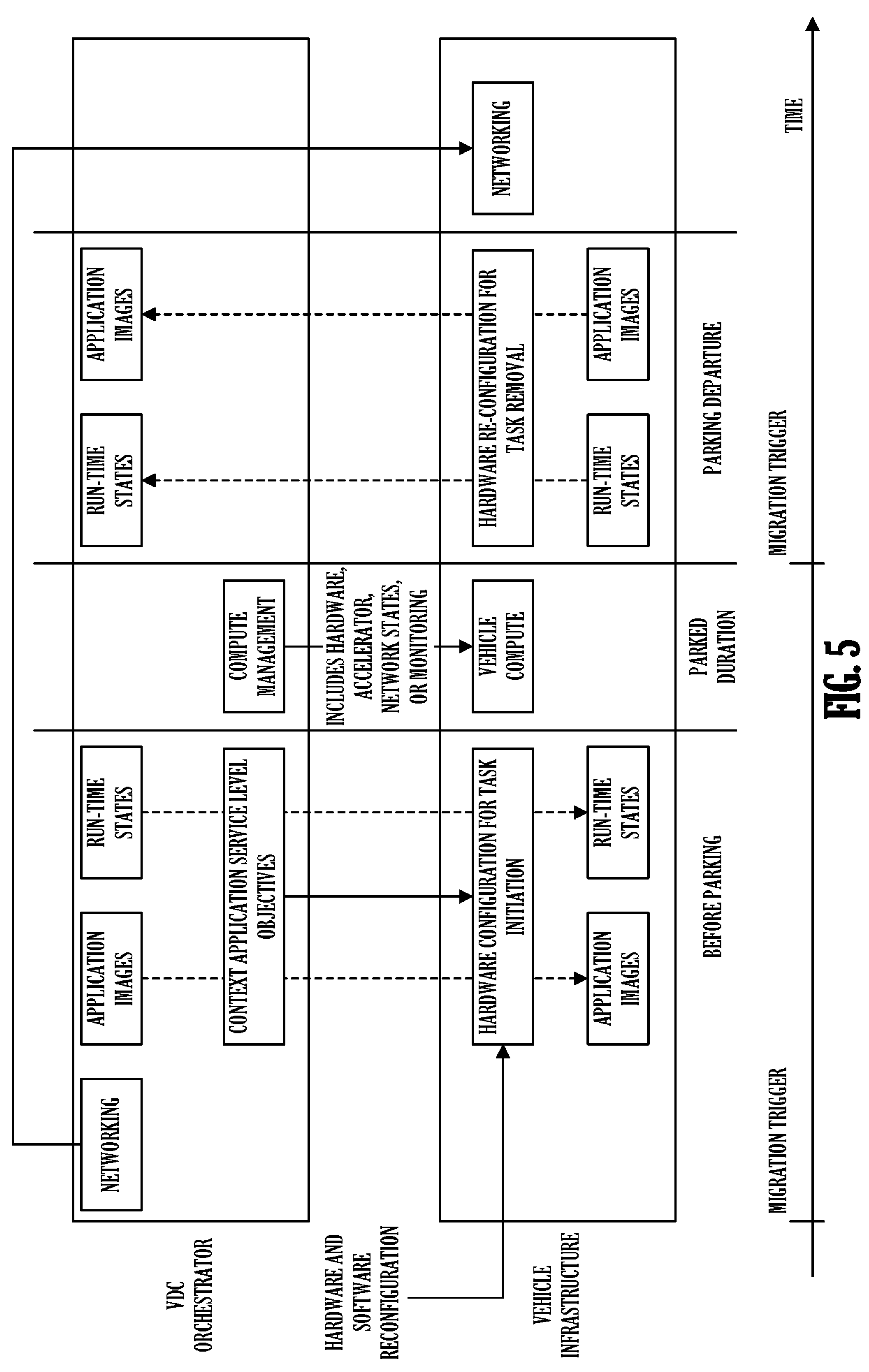
FIG. 5 illustrates an example of a timeline for parking management, according to an embodiment.

FIG. 5 illustrates an example of a timeline for parking management, according to an embodiment. As illustrated, various tasks are performed by the VDC orchestrator (on top) with the vehicle infrastructure (on bottom), such as a vehicle, over time (time progressing from left to right). Upon a migration trigger (e.g., vehicle arrival at the parking facility, networking is established between the VDC orchestrator and the vehicle infrastructure. Once networking is established, the VDC orchestrator communicates application images and runtime states along with SLO based directions that the vehicle infrastructure uses to configure hardware as the vehicle is parking. Once parked, the VDC orchestrator interacts with the vehicle compute to perform a workload.

When a second migration trigger (e.g., vehicle departure) occurs, the vehicle communicates deliverables (e.g., runtime states of the workload, or removal of application images) to the VDC orchestrator and restores hardware to a state suitable for operation of the vehicle. Finally, the networking connection is terminated.

Figure 6A:
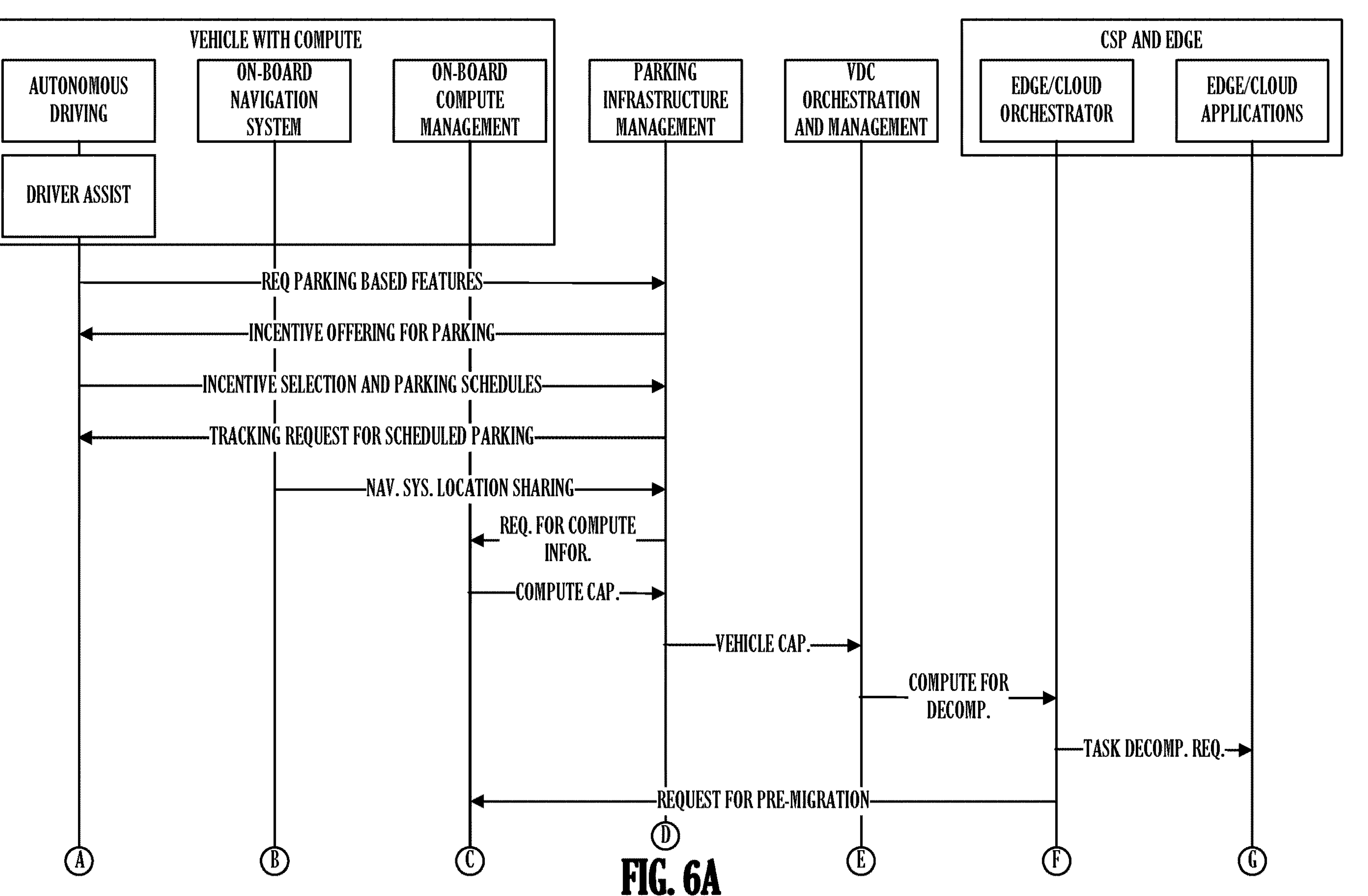
FIGS. 6A and 6B illustrate an example of component signaling, according to an embodiment.
Figure 6B:
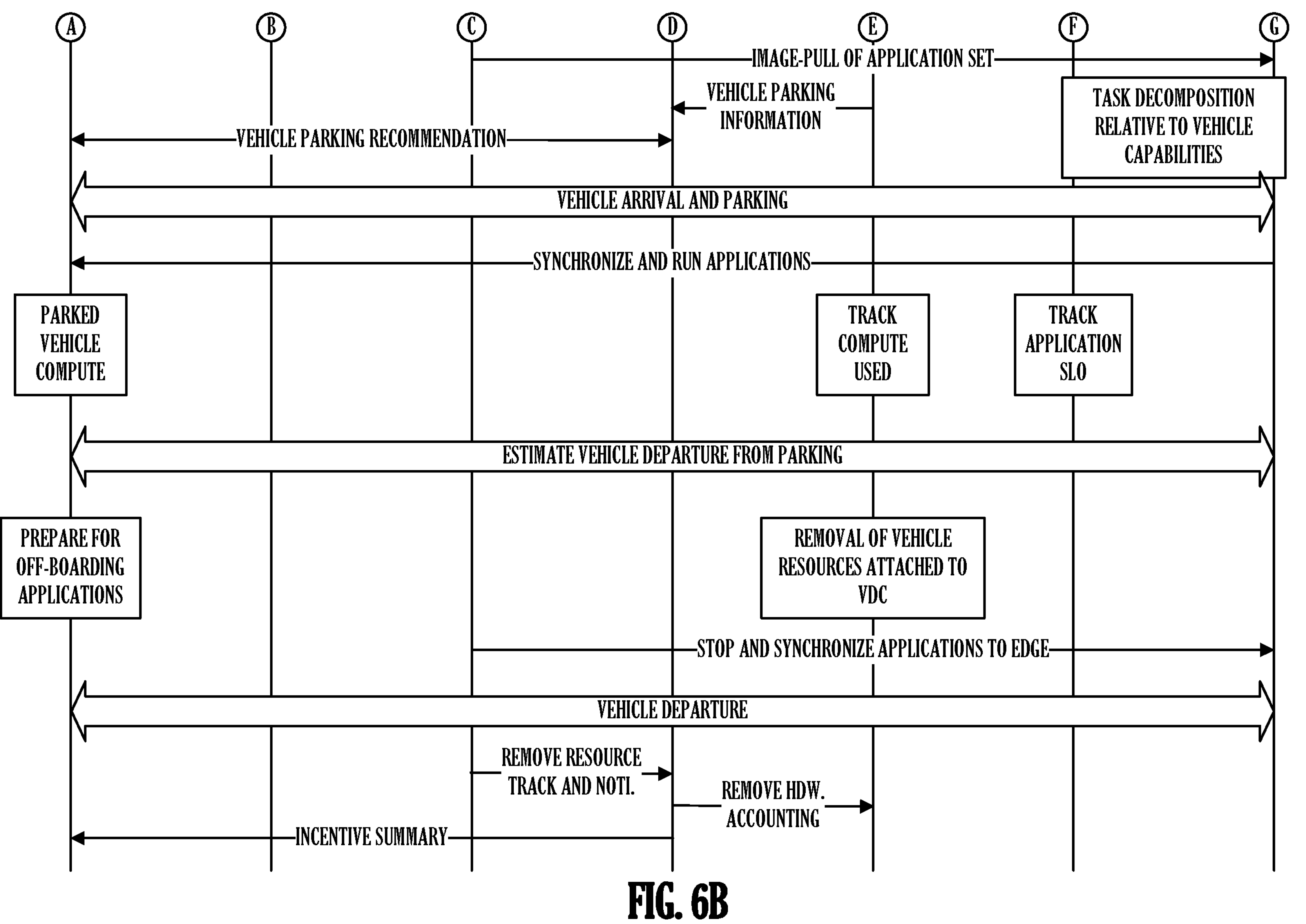

FIGS. 6A and 6B illustrate an example of component signaling, according to an embodiment. Starting on FIG. 6A, a vehicle makes a request for parking based features. The parking infrastructure responds with an incentive for use of on-board compute of the vehicle. The vehicle responds with a selection of incentive and provides a schedule of stay (e.g., a parking schedule). The parking infrastructure makes a request to track the parking schedule to plan for virtual cluster composition.

The on-board navigation of the vehicle informs the parking infrastructure of the vehicle position. The parking infrastructure makes a request for compute information. The on-board compute management of the vehicle responds with compute capabilities of the vehicle. The parking infrastructure forwards the vehicle capabilities to the VDC orchestrator. The VDC orchestrator provides the compute capabilities to an edge or cloud orchestrator enable workload decomposition. The edge or cloud orchestrator may then request task decomposition requirements from edge or cloud applications.

The edge or cloud orchestrator may then make a pre-migration (e.g., loading of images or data) request to the on-board compute management of the vehicle. Continuing on FIG. 6B, the on-board compute management of the vehicle responds with an image pull request of the edge or cloud applications. The edge or cloud applications may perform vehicle capability specific task decomposition. Also, the VDC orchestrator signals the parking infrastructure with an instruction of where to instruct the vehicle to park. The vehicle parking recommendation is communicated between the parking infrastructure and the driving control of the vehicle.

When the vehicle arrives and parks, the edge or cloud applications synchronize with the vehicle and execution of the workloads occurs, where vehicle compute is used, the VDC orchestrator tracks resources used (e.g., for incentive accounting) and the edge or cloud orchestrator tracks application performance with respect to SLO (e.g., to migrate if necessary). When vehicle departure is estimated, the vehicle prepares to off-board and the VDC orchestrator prepares to remove the vehicle as a resource. The on-board compute management of the vehicle communicates with the edge or cloud application to stop workload execution and synchronize data (e.g., state). Upon vehicle departure, the on-board compute management of the vehicle communicates the resources used during execution to the parking infrastructure. The parking infrastructure, in turn, provides the hardware accounting to the VDC orchestrator. The parking infrastructure also provides a summary of the incentives earned to the vehicle.

In an example, a cross-domain solution (CDS) may be used to physically support the compute infrastructure inside the vehicle with the in-vehicle on-board compute and data, along with the autonomous driving infrastructure. In general, CDS uses two domains. Domain 1 is an unsecure, or common area of hardware that may be used for sharing with other infrastructures. In the present case, this is where an application from the edge or cloud orchestrator would be placed. Domain 2 is secure, such as where in-vehicle internals (e.g., autonomous driving, networks, navigation, and other vehicle controllers) reside and is protected by a physical isolation provided by the cross-domains.

Parking is a ubiquitous part of vehicle management and virtually every office building, shopping complex, university, restaurant, or stadium has parking accommodations. In an example, learning (e.g., artificial intelligence agents) may be located at two places, parking management on premises, or at the edge or cloud orchestrator. Typically, these locations possess sufficient compute due to other obligations, such as scene intelligence, security analysis, or other protocols in place for vehicle management. In an example, the model learning and test data may be implemented using federated learnings, where large fleet management such delivery companies, rental car companies, trucking companies, or EV charging station companies, have already integrated fleet management to track this data. Consider a mail-order company warehouse that has a moving fleet that can be used make connections between a delivery schedule and a parking schedule, such that the vehicle fleet compute may be offered as edge services.

In an example, the learning agent generates both application profiles along with the decomposition of application in FDUs. In an example, the learning agent provides the common cluster set, which is a virtualized instance of group of vehicles that make up a VDC for applications. As noted above, real-time monitors may be used to track VDC instances. The learning agent may map the applications in terms of packages to a common cluster set through a ranking based system. The orchestrator may pick the set and match to the continuous tracking of vehicle arrival to select an optimal combination of (based on a ranking mechanism of the VDC) virtual cluster and application package.

Figure 7:
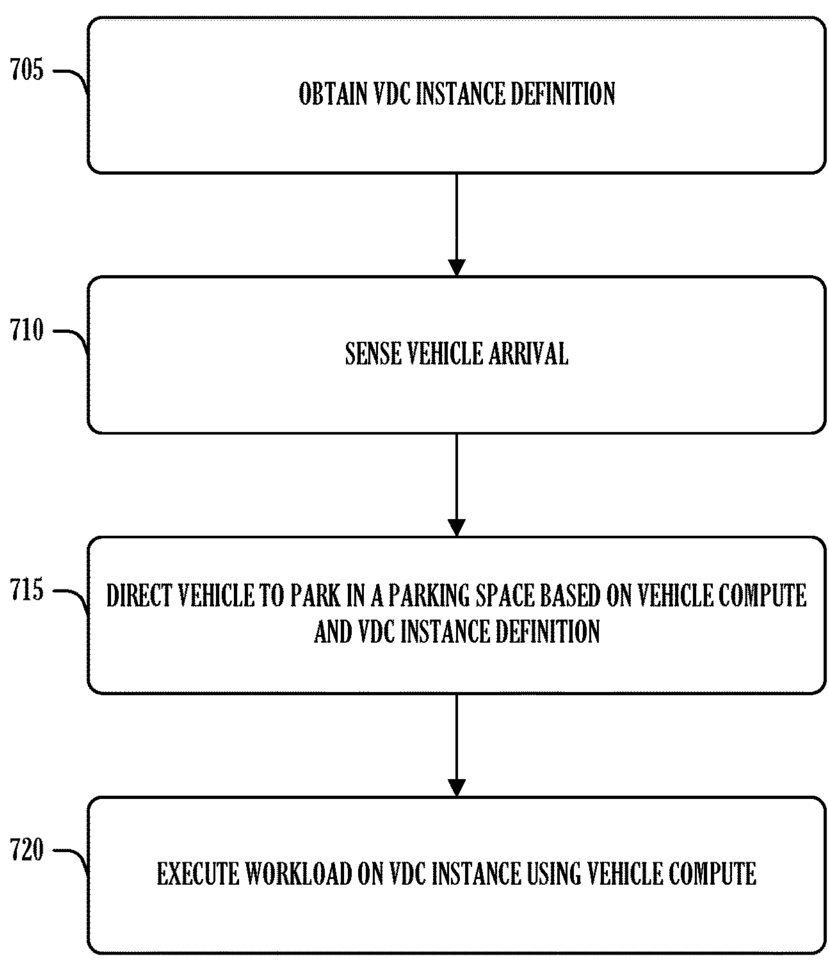
FIG. 7 illustrates a flow diagram of an example of a method for vehicle management in vehicle data center, according to an embodiment.

FIG. 7 illustrates a flow diagram of an example of a method 700 for vehicle management in vehicle data center, according to an embodiment. The operations of the method 700 are performed by computational hardware, such as that described above or below (e.g., processing circuitry).

At operation 705, a definition for a vehicle data center virtual instance is obtained (e.g., retrieved or received). In an example, the definition includes a set of parking spaces for vehicles and a set of computational metrics. In an example, the vehicle data center virtual instance is defined over a time period. In an example, a second parking space for the definition belongs to a second definition for a second vehicle data center virtual instance outside of the time period.

At operation 710, an arrival of a vehicle is sensed.

At operation 715, an instruction to park the vehicle in one parking space of the set of parking spaces is signaled based on a report of computational capabilities of the vehicle and the set of computational metrics. In an example, the set of parking spaces are contiguous. In an example, the set of parking spaces are within a predefined distance from each other.

In an example, the set of computational metrics include a list of hardware. In an example, the list of hardware includes an accelerator. In an example, the list of hardware includes a set of types of hardware and a count of each type.

In an example, signaling the instruction to park the vehicle in the one parking space of the set of parking spaces includes providing an instruction to an autonomous driving system of the vehicle to park in the one parking space in the set of parking spaces. In an example, signaling the instruction to park the vehicle in the one parking space of the set of parking spaces includes providing an instruction to a driver to park in the one parking space in the set of parking spaces. In an example, providing the instruction to the driver includes causing a ticket to be printed at an entry point. In an example, providing the instruction to the driver includes causing a parking identifier or a map to be communicated to a device of the driver. In an example, signaling the instruction to park the vehicle in the one parking space of the set of parking spaces includes providing an instruction to a signaling mechanism of a parking facility to lead a driver of the vehicle or an autonomous driving system of the vehicle to the one parking space.

At operation 720, a workload is performed on the vehicle data center virtual instance including use of the computational capabilities of the vehicle. In an example, the operations of the method 700 also include transmitting a portion of the workload to the vehicle while the vehicle is parking in the one parking space. In an example, the operations of the method 700 also include decomposing a task to create the workload based on the vehicle data center virtual instance. In an example, decomposing the task to create the workload is based on a predefined start period for the vehicle data center virtual instance.

In an example, the operations of the method 700 also include obtaining a signal that the vehicle will leave the one parking space and migrating a portion of the workload using a computational resource of the vehicle. In an example, migrating the portion of the workload includes transferring the portion of the workload to an edge server. In an example, migrating the portion of the workload includes transferring the portion of the workload to a second vehicle parked in the set of parking spaces.

Figure 8:
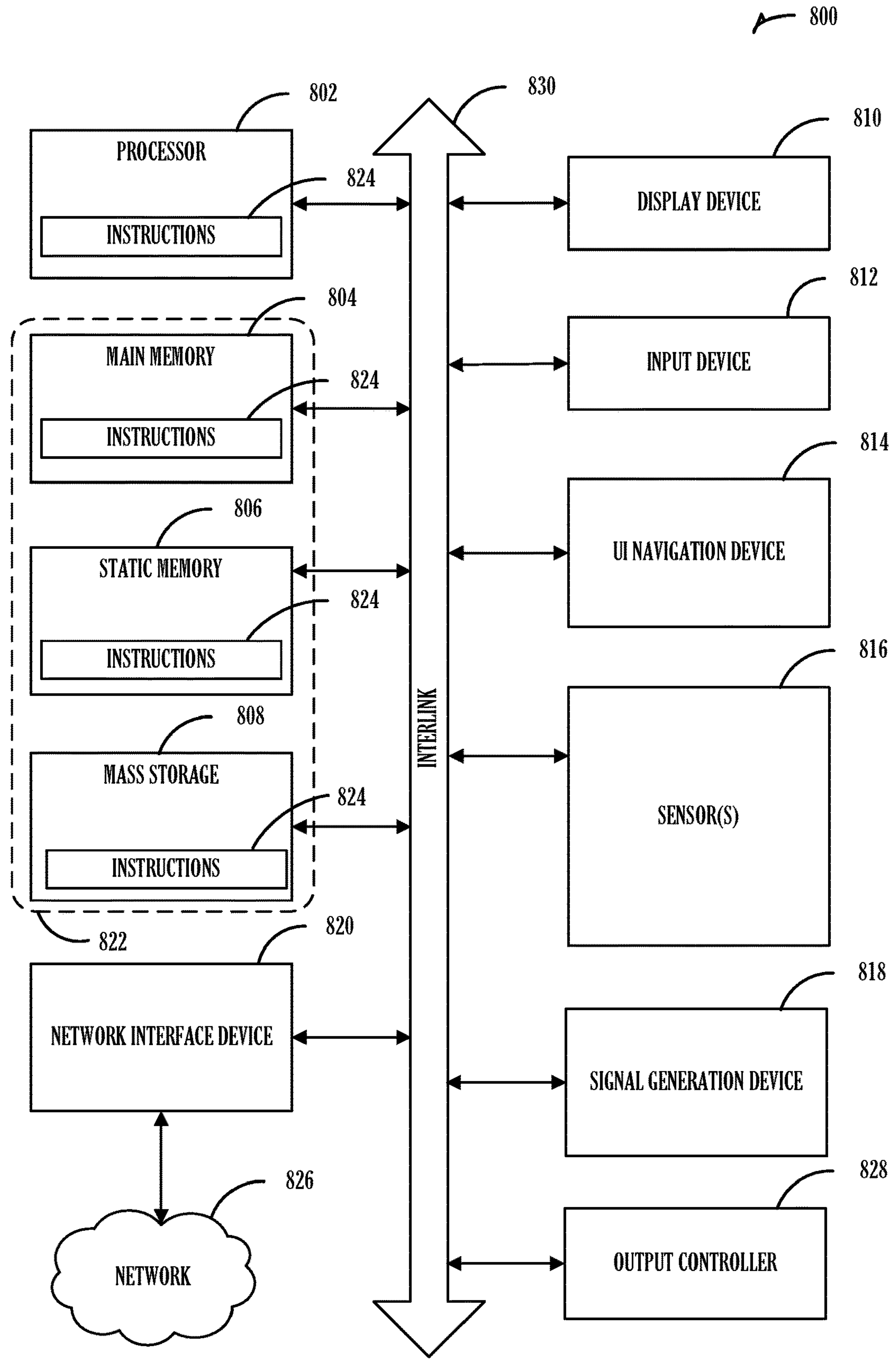
FIG. 8 is a block diagram illustrating an example of a machine upon which one or more embodiments may be implemented.

FIG. 8 illustrates a block diagram of an example machine 800 upon which any one or more of the techniques (e.g., methodologies) discussed herein may perform. Examples, as described herein, may include, or may operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 may include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drives, tape drives, flash storage, or other block devices) some or all of which may communicate with each other via an interlink (e.g., bus) 830. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 808, a signal generation device 818 (e.g., a speaker), a network interface device 820, and one or more sensors 816, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 may be, or include, a machine readable medium 822 on which is stored one or more sets of data structures or instructions 824 (e.g., software) embodying or utilized by any one or more of the techniques or functions described herein. The instructions 824 may also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 may constitute the machine readable media 822. While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 822 may be representative of the instructions 824, such as instructions 824 themselves or a format from which the instructions 824 may be derived. This format from which the instructions 824 may be derived may include source code, encoded instructions (e.g., in compressed or encrypted form), packaged instructions (e.g., split into multiple packages), or the like. The information representative of the instructions 824 in the machine readable medium 822 may be processed by processing circuitry into the instructions to implement any of the operations discussed herein. For example, deriving the instructions 824 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 824.

In an example, the derivation of the instructions 824 may include assembly, compilation, or interpretation of the information (e.g., by the processing circuitry) to create the instructions 824 from some intermediate or preprocessed format provided by the machine readable medium 822. The information, when provided in multiple parts, may be combined, unpacked, and modified to create the instructions 824. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 824 may be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

Additional Notes & Examples

Example 1 is an apparatus comprising: a memory configured to hold instructions; and processing circuitry that, when in operation, is configured by the instructions to: obtain a definition for a vehicle data center virtual instance, the definition specifying: a set of parking spaces for vehicles; and a set of computational metrics; sense an arrival of a vehicle; signal an instruction to park the vehicle in one parking space of the set of parking spaces based on a report of computational capabilities of the vehicle and the set of computational metrics; and perform a workload on the vehicle data center virtual instance including use of the computational capabilities of the vehicle.

In Example 2, the subject matter of Example 1, wherein the vehicle data center virtual instance is defined over a time period.

In Example 3, the subject matter of Example 2, wherein a second parking space for the definition is exclusive to a second definition for a second vehicle data center virtual instance outside of the time period.

In Example 4, the subject matter of any of Examples 1-3, wherein, to signal the instruction to park the vehicle in the one parking space of the set of parking spaces, the processing circuitry is configured to provide an instruction to an autonomous driving system of the vehicle to park in the one parking space in the set of parking spaces.

In Example 5, the subject matter of any of Examples 1-4, wherein, to signal the instruction to park the vehicle in the one parking space of the set of parking spaces, the processing circuitry is configured to provide an instruction to a driver to park in the one parking space in the set of parking spaces.

In Example 6, the subject matter of Example 5, wherein, to provide the instruction to the driver, the processing circuitry is configured to cause a ticket to be printed at an entry point.

In Example 7, the subject matter of any of Examples 5-6, wherein, to provide the instruction to the driver, the processing circuitry is configured to cause a parking identifier or a map to be communicated to a device of the driver.

In Example 8, the subject matter of any of Examples 1-7, wherein, to signal the instruction to park the vehicle in the one parking space of the set of parking spaces, the processing circuitry is configured to provide an instruction to a signaling mechanism of a parking facility to lead a driver of the vehicle or an autonomous driving system of the vehicle to the one parking space.

In Example 9, the subject matter of any of Examples 1-8, wherein the set of parking spaces are contiguous.

In Example 10, the subject matter of any of Examples 1-9, wherein the set of parking spaces are within a predefined distance from each other.

In Example 11, the subject matter of any of Examples 1-10, wherein the set of computational metrics include a list of hardware.

In Example 12, the subject matter of Example 11, wherein the list of hardware includes an accelerator.

In Example 13, the subject matter of any of Examples 11-12, wherein the list of hardware includes a set of types of hardware and a count of each type.

In Example 14, the subject matter of any of Examples 1-13, wherein the processing circuitry is further configured to decompose a task to create the workload based on the vehicle data center virtual instance.

In Example 15, the subject matter of Example 14, wherein the processing circuitry is configured to base decomposition of the task to create the workload on a predefined start period for the vehicle data center virtual instance.

In Example 16, the subject matter of any of Examples 1-15, wherein the processing circuitry is further configured to transmit a portion of the workload to the vehicle while the vehicle is parking in the one parking space.

In Example 17, the subject matter of any of Examples 1-16, wherein the processing circuitry is further configured to: obtain a signal that the vehicle will leave the one parking space; and migrate a portion of the workload using a computational resource of the vehicle.

In Example 18, the subject matter of Example 17, wherein, to migrate the portion of the workload, the processing circuitry is configured to transfer the portion of the workload to an edge server.

In Example 19, the subject matter of any of Examples 17-18, wherein, to migrate the portion of the workload, the processing circuitry is configured to transfer the portion of the workload to a second vehicle parked in the set of parking spaces.

Example 20 is a method comprising: obtaining a definition for a vehicle data center virtual instance, the definition specifying: a set of parking spaces for vehicles; and a set of computational metrics; sensing an arrival of a vehicle; signaling an instruction to park the vehicle in one parking space of the set of parking spaces based on a report of computational capabilities of the vehicle and the set of computational metrics; and performing a workload on the vehicle data center virtual instance including use of the computational capabilities of the vehicle.

In Example 21, the subject matter of Example 20, wherein the vehicle data center virtual instance is defined over a time period.

In Example 22, the subject matter of Example 21, wherein a second parking space for the definition is exclusive to a second definition for a second vehicle data center virtual instance outside of the time period.

In Example 23, the subject matter of any of Examples 20-22, wherein signaling the instruction to park the vehicle in the one parking space of the set of parking spaces includes providing an instruction to an autonomous driving system of the vehicle to park in the one parking space in the set of parking spaces.

In Example 24, the subject matter of any of Examples 20-23, wherein signaling the instruction to park the vehicle in the one parking space of the set of parking spaces includes providing an instruction to a driver to park in the one parking space in the set of parking spaces.

In Example 25, the subject matter of Example 24, wherein providing the instruction to the driver includes causing a ticket to be printed at an entry point.

In Example 26, the subject matter of any of Examples 24-25, wherein providing the instruction to the driver includes causing a parking identifier or a map to be communicated to a device of the driver.

In Example 27, the subject matter of any of Examples 20-26, wherein signaling the instruction to park the vehicle in the one parking space of the set of parking spaces includes providing an instruction to a signaling mechanism of a parking facility to lead a driver of the vehicle or an autonomous driving system of the vehicle to the one parking space.

In Example 28, the subject matter of any of Examples 20-27, wherein the set of parking spaces are contiguous.

In Example 29, the subject matter of any of Examples 20-28, wherein the set of parking spaces are within a predefined distance from each other.

In Example 30, the subject matter of any of Examples 20-29, wherein the set of computational metrics include a list of hardware.

In Example 31, the subject matter of Example 30, wherein the list of hardware includes an accelerator.

In Example 32, the subject matter of any of Examples 30-31, wherein the list of hardware includes a set of types of hardware and a count of each type.

In Example 33, the subject matter of any of Examples 20-32, comprising decomposing a task to create the workload based on the vehicle data center virtual instance.

In Example 34, the subject matter of Example 33, wherein decomposing the task to create the workload is based on a predefined start period for the vehicle data center virtual instance.

In Example 35, the subject matter of any of Examples 20-34, comprising transmitting a portion of the workload to the vehicle while the vehicle is parking in the one parking space.

In Example 36, the subject matter of any of Examples 20-35, comprising: obtaining a signal that the vehicle will leave the one parking space; and migrating a portion of the workload using a computational resource of the vehicle.

In Example 37, the subject matter of Example 36, wherein migrating the portion of the workload includes transferring the portion of the workload to an edge server.

In Example 38, the subject matter of any of Examples 36-37, wherein migrating the portion of the workload includes transferring the portion of the workload to a second vehicle parked in the set of parking spaces.

Example 39 is at least one machine readable medium comprising instructions that, when executed by processing circuitry, cause the processing circuitry to perform operations comprising: obtaining a definition for a vehicle data center virtual instance, the definition specifying: a set of parking spaces for vehicles; and a set of computational metrics; sensing an arrival of a vehicle; signaling an instruction to park the vehicle in one parking space of the set of parking spaces based on a report of computational capabilities of the vehicle and the set of computational metrics; and performing a workload on the vehicle data center virtual instance including use of the computational capabilities of the vehicle.

In Example 40, the subject matter of Example 39, wherein the vehicle data center virtual instance is defined over a time period.

In Example 41, the subject matter of Example 40, wherein a second parking space for the definition is exclusive to a second definition for a second vehicle data center virtual instance outside of the time period.

In Example 42, the subject matter of any of Examples 39-41, wherein signaling the instruction to park the vehicle in the one parking space of the set of parking spaces includes providing an instruction to an autonomous driving system of the vehicle to park in the one parking space in the set of parking spaces.

In Example 43, the subject matter of any of Examples 39-42, wherein signaling the instruction to park the vehicle in the one parking space of the set of parking spaces includes providing an instruction to a driver to park in the one parking space in the set of parking spaces.

In Example 44, the subject matter of Example 43, wherein providing the instruction to the driver includes causing a ticket to be printed at an entry point.

In Example 45, the subject matter of any of Examples 43-44, wherein providing the instruction to the driver includes causing a parking identifier or a map to be communicated to a device of the driver.

In Example 46, the subject matter of any of Examples 39-45, wherein signaling the instruction to park the vehicle in the one parking space of the set of parking spaces includes providing an instruction to a signaling mechanism of a parking facility to lead a driver of the vehicle or an autonomous driving system of the vehicle to the one parking space.

In Example 47, the subject matter of any of Examples 39-46, wherein the set of parking spaces are contiguous.

In Example 48, the subject matter of any of Examples 39-47, wherein the set of parking spaces are within a predefined distance from each other.

In Example 49, the subject matter of any of Examples 39-48, wherein the set of computational metrics include a list of hardware.

In Example 50, the subject matter of Example 49, wherein the list of hardware includes an accelerator.

In Example 51, the subject matter of any of Examples 49-50, wherein the list of hardware includes a set of types of hardware and a count of each type.

In Example 52, the subject matter of any of Examples 39-51, wherein the operations comprise decomposing a task to create the workload based on the vehicle data center virtual instance.

In Example 53, the subject matter of Example 52, wherein decomposing the task to create the workload is based on a predefined start period for the vehicle data center virtual instance.

In Example 54, the subject matter of any of Examples 39-53, wherein the operations comprise transmitting a portion of the workload to the vehicle while the vehicle is parking in the one parking space.

In Example 55, the subject matter of any of Examples 39-54, wherein the operations comprise: obtaining a signal that the vehicle will leave the one parking space; and migrating a portion of the workload using a computational resource of the vehicle.

In Example 56, the subject matter of Example 55, wherein migrating the portion of the workload includes transferring the portion of the workload to an edge server.

In Example 57, the subject matter of any of Examples 55-56, wherein migrating the portion of the workload includes transferring the portion of the workload to a second vehicle parked in the set of parking spaces.

Example 58 is a system comprising: means for obtaining a definition for a vehicle data center virtual instance, the definition specifying: a set of parking spaces for vehicles; and a set of computational metrics; means for sensing an arrival of a vehicle; means for signaling an instruction to park the vehicle in one parking space of the set of parking spaces based on a report of computational capabilities of the vehicle and the set of computational metrics; and means for performing a workload on the vehicle data center virtual instance including use of the computational capabilities of the vehicle.

In Example 59, the subject matter of Example 58, wherein the vehicle data center virtual instance is defined over a time period.

In Example 60, the subject matter of Example 59, wherein a second parking space for the definition is exclusive to a second definition for a second vehicle data center virtual instance outside of the time period.

In Example 61, the subject matter of any of Examples 58-60, wherein the means for signaling the instruction to park the vehicle in the one parking space of the set of parking spaces include means for providing an instruction to an autonomous driving system of the vehicle to park in the one parking space in the set of parking spaces.

In Example 62, the subject matter of any of Examples 58-61, wherein the means for signaling the instruction to park the vehicle in the one parking space of the set of parking spaces include means for providing an instruction to a driver to park in the one parking space in the set of parking spaces.

In Example 63, the subject matter of Example 62, wherein the means for providing the instruction to the driver include means for causing a ticket to be printed at an entry point.

In Example 64, the subject matter of any of Examples 62-63, wherein the means for providing the instruction to the driver include means for causing a parking identifier or a map to be communicated to a device of the driver.

In Example 65, the subject matter of any of Examples 58-64, wherein the means for signaling the instruction to park the vehicle in the one parking space of the set of parking spaces include means for providing an instruction to a signaling mechanism of a parking facility to lead a driver of the vehicle or an autonomous driving system of the vehicle to the one parking space.

In Example 66, the subject matter of any of Examples 58-65, wherein the set of parking spaces are contiguous.

In Example 67, the subject matter of any of Examples 58-66, wherein the set of parking spaces are within a predefined distance from each other.

In Example 68, the subject matter of any of Examples 58-67, wherein the set of computational metrics include a list of hardware.

In Example 69, the subject matter of Example 68, wherein the list of hardware includes an accelerator.

In Example 70, the subject matter of any of Examples 68-69, wherein the list of hardware includes a set of types of hardware and a count of each type.

In Example 71, the subject matter of any of Examples 58-70, comprising means for decomposing a task to create the workload based on the vehicle data center virtual instance.

In Example 72, the subject matter of Example 71, wherein the means for decomposing the task to create the workload is based on a predefined start period for the vehicle data center virtual instance.

In Example 73, the subject matter of any of Examples 58-72, comprising means for transmitting a portion of the workload to the vehicle while the vehicle is parking in the one parking space.

In Example 74, the subject matter of any of Examples 58-73, comprising: means for obtaining a signal that the vehicle will leave the one parking space; and means for migrating a portion of the workload using a computational resource of the vehicle.

In Example 75, the subject matter of Example 74, wherein the means for migrating the portion of the workload include means for transferring the portion of the workload to an edge server.

In Example 76, the subject matter of any of Examples 74-75, wherein the means for migrating the portion of the workload include means for transferring the portion of the workload to a second vehicle parked in the set of parking spaces.

PNUM Example 77 is at least one machine-readable medium including instructions that, when executed by processing circuitry, cause the processing circuitry to perform operations to implement of any of Examples 1-76.

PNUM Example 78 is an apparatus comprising means to implement of any of Examples 1-76.

PNUM Example 79 is a system to implement of any of Examples 1-76.

PNUM Example 80 is a method to implement of any of Examples 1-76.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. An apparatus comprising:

a memory configured to store instructions; and processing circuitry configured to execute the instructions to:

obtain a definition for a vehicle data center virtual instance, the definition specifying:

a set of parking spaces for vehicles; and a set of computational metrics;

sense an arrival of a vehicle;

signal an instruction to park the vehicle in a parking space of the set of parking spaces based on a report of computational capabilities of the vehicle and the set of computational metrics;

instantiate the vehicle data center virtual instance to provide a distributed data center comprising the vehicle as a compute node; and execute a workload via the distributed data center using the computational capabilities of the vehicle.

2. The apparatus of claim 1, wherein the vehicle data center virtual instance is defined over a time period.

3. The apparatus of claim 2, wherein a second parking space is exclusive to a second definition for a second vehicle data center virtual instance outside of the time period.

4. The apparatus of claim 1, wherein, to signal the instruction to park the vehicle in the parking space of the set of parking spaces, the processing circuitry is configured to provide an instruction to an autonomous driving system of the vehicle to park in the parking space in the set of parking spaces.

5. The apparatus of claim 1, wherein, to signal the instruction to park the vehicle in the parking space of the set of parking spaces, the processing circuitry is configured to provide an instruction to a driver to park in the parking space in the set of parking spaces.

6. The apparatus of claim 1, wherein, to signal the instruction to park the vehicle in the parking space of the set of parking spaces, the processing circuitry is configured to provide an instruction to a signaling mechanism of a parking facility to lead a driver of the vehicle or an autonomous driving system of the vehicle to the parking space.

7. The apparatus of claim 1, wherein the processing circuitry is further configured to decompose a task to create the workload based on the vehicle data center virtual instance.

8. The apparatus of claim 7, wherein the processing circuitry is configured to base decomposition of the task to create the workload on a predefined start period for the vehicle data center virtual instance.

9. The apparatus of claim 1, wherein the processing circuitry is further configured to:

obtain a signal that the vehicle will leave the one-parking space; and migrate a portion of the workload using a computational resource of the vehicle.

10. The apparatus of claim 9, wherein, to migrate the portion of the workload, the processing circuitry is configured to transfer the portion of the workload to a second vehicle parked in the set of parking spaces.

11. A non-transitory machine-readable medium comprising instructions that, when executed by processing circuitry, cause the processing circuitry to perform operations comprising:

obtaining a definition for a vehicle data center virtual instance, the definition specifying:

a set of parking spaces for vehicles; and a set of computational metrics;

sensing an arrival of a vehicle;

signaling an instruction to park the vehicle in a parking space of the set of parking spaces based on a report of computational capabilities of the vehicle and the set of computational metrics;

instantiating the vehicle data center virtual instance to provide a distributed data center comprising the vehicle as a compute node; and executing a workload via the distributed data center using the computational capabilities of the vehicle.

12. The non-transitory machine-readable medium of claim 11, wherein the vehicle data center virtual instance is defined over a time period.

13. The non-transitory machine-readable medium of claim 12, wherein a second parking space is exclusive to a second definition for a second vehicle data center virtual instance outside of the time period.

14. The at least one non-transitory machine-readable medium of claim 11, wherein signaling the instruction to park the vehicle in the parking space of the set of parking spaces includes providing an instruction to an autonomous driving system of the vehicle to park in the parking space in the set of parking spaces.

15. The non-transitory machine-readable medium of claim 11, wherein signaling the instruction to park the vehicle in the parking space of the set of parking spaces includes providing an instruction to a driver to park in the parking space in the set of parking spaces.

16. The non-transitory machine readable medium of claim 11, wherein signaling the instruction to park the vehicle in the parking space of the set of parking spaces includes providing an instruction to a signaling mechanism of a parking facility to lead a driver of the vehicle or an autonomous driving system of the vehicle to the parking space.

17. The non-transitory machine-readable medium of claim 11, wherein the operations comprise decomposing a task to create the workload based on the vehicle data center virtual instance.

18. The non-transitory machine-readable medium of claim 17, wherein decomposing the task to create the workload is based on a predefined start period for the vehicle data center virtual instance.

19. The non-transitory machine-readable medium of claim 11, wherein the operations comprise:

obtaining a signal that the vehicle will leave the one-parking space; and migrating a portion of the workload using a computational resource of the vehicle.

20. The non-transitory machine-readable medium of claim 19, wherein migrating the portion of the workload includes transferring the portion of the workload to a second vehicle parked in the set of parking spaces.

* * * * *